United States Patent [19]
Blane

[11] 3,950,832
[45] Apr. 20, 1976

[54] SAW SHARPENING FILE

[76] Inventor: Troy F. Blane, 6312 Specht Ave., Bell Gardens, Calif. 90201

[22] Filed: Nov. 18, 1974

[21] Appl. No.: 524,980

[52] U.S. Cl. .................................................. 29/78
[51] Int. Cl.² ........................................ B23D 71/04
[58] Field of Search ........................................ 29/78

[56] References Cited
UNITED STATES PATENTS

| | | | |
|---|---|---|---|
| 114,824 | 5/1871 | Hyland | 29/78 |
| 138,256 | 4/1873 | Johnson | 29/78 |
| 1,066,340 | 7/1913 | Thomas | 29/78 |
| 1,379,779 | 5/1921 | Pritz | 29/78 |
| 1,751,034 | 3/1930 | Erb | 29/78 |

*Primary Examiner*—Leonidas Vlachos

[57] ABSTRACT

An elongate multi-sided file in which the file defining serrated surfaces extend substantially the length thereof, with the surfaces intersecting to define a number of longitudinally extending edges. The longitudinal edges have a number of spaced teeth formed thereon. When a saw requires sharpening it is due to the edges of the teeth having become dull and of round configuration. The angular relationship between two adjoining file surfaces on the invention is that which existed in the V-shaped space between adjacent edges of teeth on a saw when the edges were in a sharpened condition. When the file is reciprocated in one of such spaces on a dull file, the teeth on one of the longitudinal edges of the file cut into the inner apex defined at the junction of the edges of two adjacently disposed teeth, as material is concurrently removed from these edges by abrating contact with two of the serrated surfaces. The above described operation is performed sequentially on all of the teeth of a saw to provide the teeth of the saw with sharp cutting edges. The use of the file of the structure above described has been found from experience to increase the number of saws that may be sharpened by four to five per hour.

2 Claims, 5 Drawing Figures

SAW SHARPENING FILE

BACKGROUND OF THE INVENTION

1. Field of the Invention

Saw sharpening file.

2. Description of the Prior Art

In the past, it has been common practice to sharpen saws having V-shaped spaces between the teeth thereof by a file that has three elongate longitudinally extending serrated surfaces, with the surfaces intersecting at three longitudinally extending edges. As such a file is used, the longitudinal edges are subjected to abrasive action, and the serrations defined on the edges which are relatively shallow are quickly worn away and the file becomes useless.

The primary purpose in devising the present invention is to supply a saw sharpening file that will have a relatively long life, permits a saw to be sharpened in a substantially shorter time than has been possible with previously available files, and a file that can be used with conventional saw sharpening equipment without modification to the latter.

Another object of the invention is to supply a saw sharpening file that is characterized by the longitudinal edges thereof having a number of longitudinally spaced teeth formed thereon, and the teeth being undercut on the leading edges thereof to more efficiently remove material from the saw at the inner apex of the V-shaped spaced defined between the adjoining edges of two adjacently disposed saw teeth.

A still further object of the invention is to provide a saw sharpening file that will have a life expectancy substantially greater than the prior art devices of this type.

SUMMARY OF THE INVENTION

An improved file for use in sharpening a saw that has a number of first teeth on an edge of the body thereof, with each tooth being defined by angularly disposed edges that intersect at a first apex, and the adjoining edges of two adjacent teeth intersecting at a second apex to define a V-shaped space between the two teeth.

The present invention is a file of the type that has a hard elongate member of non-circular transverse cross section that has first and second ends, and has a number of serrated file defining surfaces thereon that are angularly disposed relative to one another and intersect to define at least one longitudinal edge therebetween.

The longitudinal edge so formed has a number of spaced second teeth defined thereon, with the second teeth being generally triangular in shape and having an undercut leading edge. When the file is reciprocated transversely relative to a saw and disposed between the edges of two adjacently disposed saw teeth, the file as it moves towards the saw cuts into the second apex and concurrently two of the file defining surfaces cut into the adjoining edges of two adjacently disposed saw teeth to remove material therefrom, and in so doing sharpening the teeth and returning the teeth to their initial configuration. As the teeth are sharpened in the manner above described, the second and first apexes of the adjacent saw teeth are moved inwardly relative to the body of the saw, with the triangular configuration of the teeth being returned to the shape that they initially had prior to the saw being used.

The file that is the subject matter of the present invention permits the sharpening of a saw to be carried out at a more rapid rate than is possible with prior art files, and the files formed in accordance with the present invention having substantially longer lives than previously available files.

DESCRIPTION OF THE PREFERRED EMBODIMENT

Figure 1:
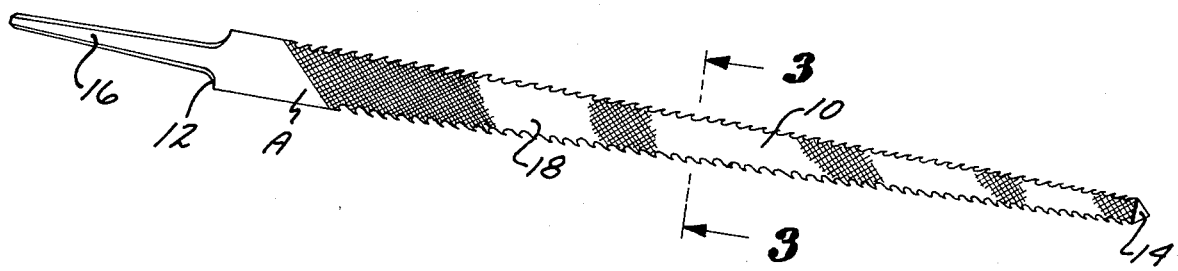
FIG. 1 is a perspective view of a saw sharpening file embodying the present invention.

The saw sharpening file A is shown in FIG. 1 and includes an elongate rigid member 10 formed from a hard material that has a first end 12 and second end 14. A tong 16 projects from the first end 12 as is conventional with such files.

Member 10 is preferably of triangular transverse cross section and is defined by three elongate file defining serrated surfaces 18, 20 and 22 that extend substantially the length of the member. The surface 18, 20 and 22 at their intersections define three longitudinal edges 24, 26 and 28 as shown in FIG. 1. The edges 24, 26 and 28 taper towards one another, with the edges being laterally spaced from one another a maximum distance adjacent first end 12, and a minimum distance adjacent the second end 14.

Figure 2:
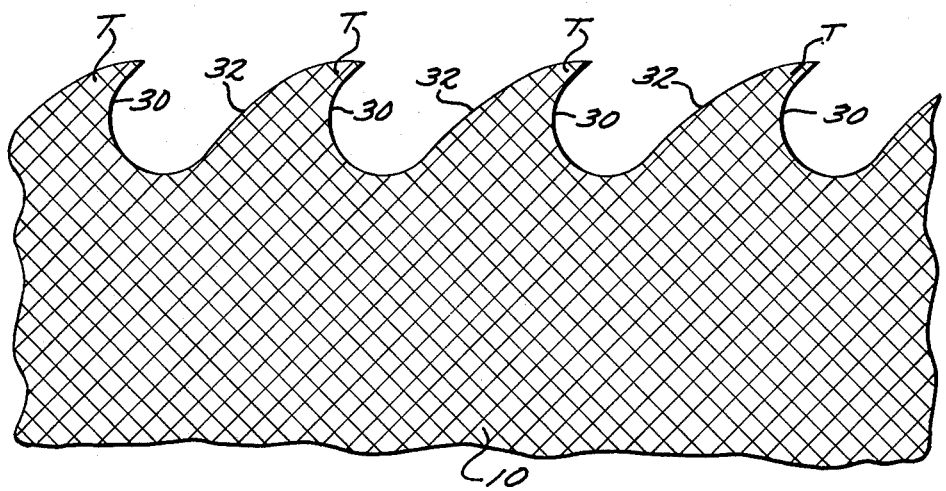
FIG. 2 is an enlarged longitudinal cross sectional view of the tooth defining longitudinal edges of the file taken on the line 2—2 of FIG. 3.
Figure 3:
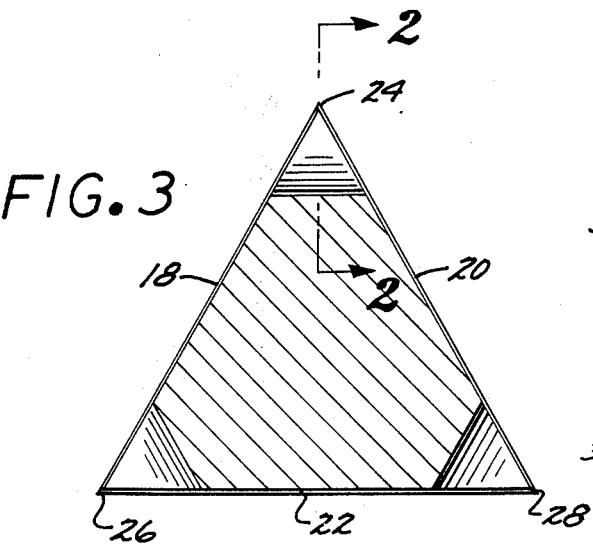
FIG. 3 is a transverse cross sectional view of the file taken on the line 3—3 of FIG. 1.

The edges 24, 26 and 28 each have a number of spaced teeth T defined thereon, with each tooth T having a leading or cutting edge 30 and a trailing or non-cutting edge 32. Each cutting edge 30 is of convex configuration as shown in FIG. 2 and is undercut into a tooth T. Each trailing edge 32 is of convex shape and longer than the leading edge 30 associated therewith.

Figure 4:
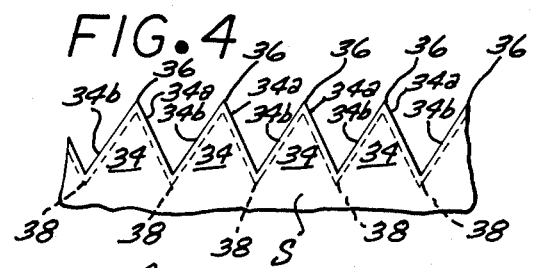
FIG. 4 is a fragmentary side elevational view of a saw illustrating the teeth defining on a longitudinal edge thereof, with the teeth being shown in solid line prior to being sharpened and the configuration of the teeth being shown in phantom line after they have been sharpened.
Figure 5:
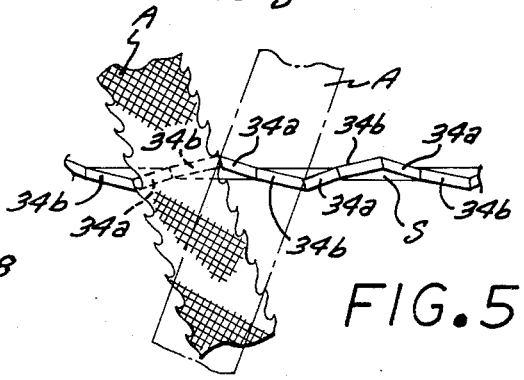
FIG. 5 illustrates the two positions the file occupies when being reciprocated relative to a saw to sharpen the teeth of the latter.

An edge section of a saw S is shown in FIGS. 4 and 5 on which a number of teeth 34 of triangular shape are formed that have edges 34a and 34b that are angularly disposed relative to one another and define first and second apexes 36 and 38 at their intersections. The teeth 34 are so formed that an edge 34a of one tooth and the edge 34b of an adjacent tooth are axially aligned and angularly disposed relative to the body of the saw S as shown in FIG. 5. The edges 34a are cutting edges when the saw S is moved to the right as viewed in FIG. 5. Edges 34b are cutting edges when the saw S is moved to the left as viewed in FIG. 5. The edges 34a and 38b will have maximum sawing capabilities when the corners thereof are sharp.

When a saw S is being sharpened the file A is successively reciprocated transversely thereacross in first and second positions, with the first position being shown in solid line in FIG. 5, and the second position being illustrated in phantom line in the same figure. In both the first and second positions two of the adjacently disposed serrated surfaces 18, 20 and 22 concurrently engage an edge 34a of one tooth 34 and the edge 34b of the tooth adjacent thereto, which edges 34a and 34b are axially aligned.

As the edges 34a and 34b are engaged by the reciprocating file A the edges 34a and 34b have material removed therefrom by abrasive contact with two of the surfaces 18, 20 or 22, and the teeth T then cutting into one of the second apexes 38. By successively subjecting the teeth 34 to the action of the file A as above described the first and second apexes 36 and 38 and edges 34a and 34b are moved inwardly from the positions shown in solid line in FIG. 4 to that illustrated in phantom line in the same figure, and the teeth 34 sharpened as a result thereof.

The use and operation of the invention has been described previously in detail and need not be repeated.

I claim:

1. A saw sharpening file of elongate shape and triangular transverse cross section that has first and second elongate side surfaces on which filing serrations are defined, said first and second side surfaces angularly disposed relative to one another to the same degree as the angle between teeth on the saw that is to be sharpened and said first and second side surfaces merging at a first longitudinally extending apex, wherein the improvement comprises:

a plurality of longitudinally spaced teeth of triangular transverse cross section defined on said first apex, with each of said teeth being roughly triangular in shape and defined by a concave leading edge and a convex trailing edge.

2. A saw as defined in claim 1 in which said file in addition includes a third elongate side surface on which filing serrations are defined, with said third surface merging with said first and second surfaces to define second and third longitudinally extending apexes, and said second and third apexes having a plurality of teeth defined thereon identical to said teeth on said first apex.

* * * * *